United States Patent
Paul et al.

(10) Patent No.: US 8,140,369 B2
(45) Date of Patent: Mar. 20, 2012

(54) SYSTEM AND METHOD FOR OPTIMIZING MANUFACTURING WORKFORCE

(75) Inventors: Robin Paul, Tillsonburg (CA); Thomas Hicks, Fergus (CA); Dan Ryder, Kitchener (CA); Angela Colleen Weber-Hicks, Fergus (CA); Gregory Evers, Kitchener (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 757 days.

(21) Appl. No.: 12/195,466

(22) Filed: Aug. 21, 2008

(65) Prior Publication Data
US 2010/0049574 A1   Feb. 25, 2010

(51) Int. Cl.
G06F 17/50   (2006.01)
(52) U.S. Cl. ...................................... 705/7.14
(58) Field of Classification Search ............... 705/7.14
See application file for complete search history.

(56) References Cited

U.S. PATENT DOCUMENTS

| | | | |
|---|---|---|---|
| 5,093,794 A | 3/1992 | Howie et al. | |
| 5,111,391 A | 5/1992 | Fields et al. | |
| 5,541,848 A * | 7/1996 | McCormack et al. | 700/213 |
| 6,145,190 A * | 11/2000 | Shin et al. | 29/840 |
| 6,571,193 B1 * | 5/2003 | Unuma et al. | 702/141 |
| 6,587,851 B1 | 7/2003 | Ditcharo et al. | |
| 6,785,662 B1 * | 8/2004 | Guy et al. | 706/13 |
| 6,865,581 B1 * | 3/2005 | Cloninger et al. | 705/7.42 |
| 7,127,412 B2 | 10/2006 | Powell et al. | |
| 2001/0032112 A1 | 10/2001 | Linz | |
| 2002/0032653 A1 * | 3/2002 | Schutzer | 705/40 |
| 2002/0065700 A1 | 5/2002 | Powell et al. | |
| 2003/0126059 A1 | 7/2003 | Hensley et al. | |
| 2003/0167238 A1 * | 9/2003 | Zeif | 705/400 |
| 2005/0055697 A1 | 3/2005 | Buco et al. | |
| 2005/0119983 A1 * | 6/2005 | Bonabeau et al. | 706/46 |
| 2005/0131737 A1 * | 6/2005 | Joseph et al. | 705/2 |
| 2005/0159968 A1 | 7/2005 | Cozzolino | |
| 2006/0200008 A1 * | 9/2006 | Moore-Ede | 600/300 |
| 2006/0253464 A1 * | 11/2006 | Thilakawardana et al. | 707/100 |
| 2006/0259472 A1 * | 11/2006 | MacClellan | 707/3 |
| 2006/0288346 A1 * | 12/2006 | Santos et al. | 718/102 |

(Continued)

OTHER PUBLICATIONS

Tharmmaphornphilas, Wipawee, et al. "A Methodology to Create Robust Job Rotation Schedules." Ann Oper Res (2007) 155: 339-360, published online on Jul. 7, 2007 by Springer Science+Business Media, LLC.*

(Continued)

*Primary Examiner* — Susanna M Meinecke Diaz
(74) *Attorney, Agent, or Firm* — Gifford, Krass, Sprinkle, Anderson & Citkowski, P.C.

(57) ABSTRACT

A method and system for optimizing the manufacturing workforce and reducing workforce boredom in an assembly plant is provided. A master database contains all the plant workers along with all of the assembly tasks required to be performed at the assembly plant for a predetermined period, a repetitive threshold value for each worker, and a burden value for each assembly task. Each worker is assigned to a particular assembly task based upon the attributes of the worker and the assembly task requirements. A first schedule is generated by matching assembly tasks to a worker. The first schedule is then used to generate a second schedule such that workers do not exceed a repetitive value threshold or a burden value threshold. Thus the method and system generates schedules such that workers are given a variety of assembly tasks and therefore are not bored by performing the same task repetitively.

10 Claims, 21 Drawing Sheets

U.S. PATENT DOCUMENTS

2007/0067196 A1    3/2007  Usui
2007/0288287 A1*  12/2007  Hayler et al. ............... 705/9
2008/0109271 A1*   5/2008  Smith et al. ............... 705/7

OTHER PUBLICATIONS

Carnahan, Brian J. et al. "A Genetic Algorithm for Designing Job Rotation Schedules Considering Ergonomic Constraints." IEEE, pp. 1093-1098, © 1999.*

Kerce, Elyse W. "Boredom at Work: Implications for the Design of Jobs with Variable Requirements." Navy Personnel Research and Development Center, NPRDC TR 85-37, Sep. 1985.*

Alex Corscadden A Synthesis of a Team Member Scheduling Application; May 8, 2006; University of Waterloo Software Engineering.

* cited by examiner

|      | Period 1   | Period 2   | Period 3   | Period 4   | Period 5   |
|------|------------|------------|------------|------------|------------|
| TM1  | Process 1  | Process 2  | Process 3  | Process 4  | Process 5  |
| TM2  | Process 2  | Process 3  | Process 1  | Process 5  | Process 6  |
| TM3  | Process 3  | Process 5  | Process 4  | Process 3  | Process 7  |
| TM4  | Process 5  | Process 1  | Process 2  | Process 7  | Process 9  |
| TM5  | Process 4  | Process 6  | Process 5  | Process 1  | Process 10 |
| TM6  | Process 6  | Process 4  | Process 7  | Process 8  | Process 11 |
| TM7  | Process 8  | Process 7  | Process 6  | Process 2  | Process 1  |
| TM8  | Process 7  | Process 8  | Process 9  | Process 10 | Process 4  |
| TM9  | Process 9  | Process 9  | Process 8  | Process 6  | Process 2  |
| TM10 | Process 11 | Process 12 | Process 10 | Process 9  | Process 3  |
| TM11 | Process 12 | Process 10 | Process 11 | Process 12 | Process 8  |

FIG - 3

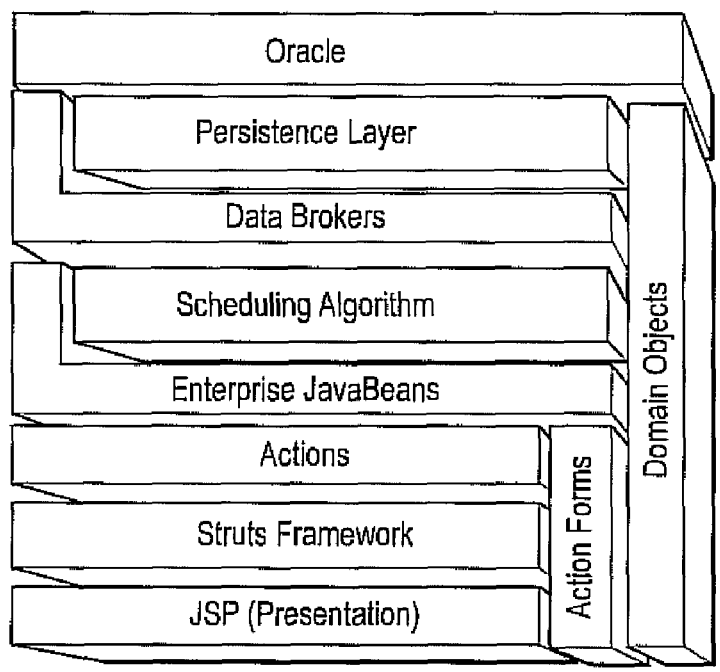

```
public class TreeScheduler implements Scheduler
{
    private PathSelector ps;
    public TreeScheduler(PathSelector ps)
    {
    this.ps = ps;
    }
    /**
    * Generate a schedule
    */
    public final Map runSchedule(List tms, List previousSchedules)
    {
      Stack procStack = new Stack();
      Map currentSchedule = new HashMap();
      List tmCopy = new ArrayList(tms);
      Map previousSchedule;
      if (!previousSchedules.isEmpty())
      {
      previousSchedule = (Map) previousSchedules.get(0);
      } else
      {
      previousSchedule = new HashMap();
      }
      Collections.shuffle(tmCopy);
      Iterator it = tmCopy.iterator();
      while (it.hasNext())
      {
          TeamMember tm = (TeamMember) it.next();
          TMNode curr = generateTreeForTM(tm, procStack,
          currentSchedule, previousSchedule);
          if (curr == null)
          { // We were unable to schedule the team member
          continue;
          }
          FairnessCalculation.calculateEdgeWeights(curr,
          previousSchedules);
          ps.selectPath(curr, currentSchedule); // selectPath will automatically
          // update the schedule
      }
        return currentSchedule;
}
/**
* Generate the subtree node for a given TM, including all processes under
* the TM
*/
public final TMNode generateTreeForTM(TeamMember tm,
```

Figure 5B

```
        Stack processedProcs, Map currentSchedule,
        Map previousSchedule)
{
    // Create the TMNode
    TMNode tmNode = new TMNode(tm);
    // Gather some process information
    Set procs = tm.processes;
    Process previousProc = (Process) previousSchedule.get(tm);
    // Setup variables
    List processNodes = new ArrayList();
    tmNode.processNodes = processNodes;
    // Walk through the processes
    Iterator it = procs.iterator();
    while (it.hasNext())
    {
Process proc = (Process) it.next();
if (previousProc != null && proc.equals(previousProc))
{ // If the previous process is this process, we'll ignore it
continue;
}
if (!processedProcs.contains(proc))
{ // If the process hasn't already appeared in the tree
// Push it onto the process stack and then attempt to generate the
// tree for the process
processedProcs.push(proc);
ProcessNode processNode = generateTreeForProcess(
proc, processedProcs, currentSchedule,
previousSchedule);
if (processNode != null)
{
processNodes.add(processNode);
}
processedProcs.pop();
}
}
// If processNodes is empty, we weren't able to fully generate the tree,
// so we'll return null
if (tmNode.processNodes.isEmpty())
{
return null;
}
return tmNode;
}
/**
 * Generate the sub tree for a process, include the currently scheduled TM if
 * he exists
```

Figure 5C

```
*/
public final ProcessNode generateTreeForProcess(
Process proc, Stack processedProcs,
Map currentSchedule, Map previousSchedule)
{
ProcessNode processNode = new ProcessNode(proc);
// We'll look for the process in the current schedule
Iterator it = currentSchedule.entrySet().iterator();
while (it.hasNext())
{
Map.Entry entry = (Map.Entry) it.next();
if (entry.getValue().equals(proc))
{ // If we find it, try to generate the subtree for the tm
TeamMember tm = (TeamMember) entry.getKey();
TMNode tmNode = generateTreeForTM(tm,
processedProcs, currentSchedule,
previousSchedule);
if (tmNode == null)
{ // Oops, we couldn't generate the TM subtree so we'll return null
// here
return null;
}
// otherwise set the tmNode on the processNode and break
processNode.tm = tmNode;
break;
}
}
return processNode;
}
}
/*****************************
* FairnessCalculation.java - Fairness calculations for the
* tree based scheduler
*****************************/
public class FairnessCalculation
{
private static final int BURDEN_WEIGHT = 3;
private static final int FREQUENCY_WEIGHT = 1;
private static final int MAX_BURDEN_SCORE = 20 * 5;
private static final int MAX_PREVIOUS_SCHEDULES = 10;
// FROM burden, TO burden
private static final int BURDEN_TRANSITIONS[][] = {
{ 0, 5, 20 }, { 5, 5, 5 }, { 10, 5, -10 } };
/**
* Calculate the edge weights for the tree rooted at tmNode
*/
```

Figure 5 D

```
public final static void calculateEdgeWeights(
TMNode tmNode, List previousSchedules)
{
Map previousSchedule = null;
if (!previousSchedules.isEmpty())
{
previousSchedule = (Map) previousSchedules.get(0);
} else
{
previousSchedule = new HashMap(0);
}
TeamMember tm = tmNode.tm;
Set processes = tm.processes;
Iterator it = processes.iterator();
while (it.hasNext())
{
Process proc = (Process) it.next();
Process previousProc = (Process) previousSchedule.get(tm);
int burden = BURDEN_WEIGHT
 * calculateBurdenValue(tm, proc, previousProc);
int freq = FREQUENCY_WEIGHT
 * calculateFrequencyValue(tm, proc, previousSchedules);
int score = (int) (burden + freq);
tmNode.processWeights.put(proc, new Integer(score));
Iterator procNodeIt = tmNode.processNodes.iterator();
while (procNodeIt.hasNext())
{
ProcessNode procNode = (ProcessNode) procNodeIt.next();
if (procNode.tm != null)
{
calculateEdgeWeights(procNode.tm, previousSchedules);
}
}
}
}
private final static int calculateBurdenValue(
TeamMember tm, Process proc, Process previousProc)
{
if (previousProc != null)
{
int currBurdens[] = proc.burdens;
int prevBurdens[] = previousProc.burdens;
int score = 0;
for (int i = 0; i < currBurdens.length; i++)
{
score += BURDEN_TRANSITIONS[currBurdens[i] - 1][prevBurdens[i] - 1];
```

Figure 5E

```
}
return score / MAX_BURDEN_SCORE;
} else
return 100;
}
private final static int calculateFrequencyValue(
TeamMember tm, Process proc, List previousSchedules)
{
int cnt, i;
i = 0;
cnt = 0;
Iterator it = previousSchedules.iterator();
while (it.hasNext() && i < MAX_PREVIOUS_SCHEDULES)
{
Map sched = (Map) it.next();
Process prevProc = (Process) sched.get(tm);
if (proc.equals(prevProc))
cnt++;
i++;
}
if (cnt != 0)
return 100 - ((100 * cnt) / i);
else
return 100;
}
}
/*******************************
 * AveragePathSelector.java - A path selector which selects
 * the path with the highest average path length.
 *******************************/
public class AveragePathSelector implements PathSelector
{
public final void selectPath(TMNode root,
Map currentSchedule)
{
PathInfo path = new PathInfo();
path.path = new ArrayList();
path.total = 0;
path = evaluatePath(root, path);
extractScheduleFromPath(path, currentSchedule);
}
private final void extractScheduleFromPath(
PathInfo path, Map currentSchedule)
{
Iterator it = path.path.iterator();
while (it.hasNext())
```

Figure 5 F

```
{
TMNode tmNode = (TMNode) it.next();
ProcessNode processNode = (ProcessNode) it.next();
currentSchedule
.put(tmNode.tm, processNode.process);
}
}
/**
 * Collect a path based on the subtree root. Use a DFT. - Collect total going
 * down - Calculate averages and select best path below based on the average
 * on that path
 */
private final PathInfo evaluatePath(TMNode root,
PathInfo pathAbove)
{
PathInfo bestPath = null;
int bestAvg = 0;
Iterator it = root.processNodes.iterator();
while (it.hasNext())
{
ProcessNode procNode = (ProcessNode) it.next();
PathInfo path = new PathInfo();
path.total = pathAbove.total
+ ((Integer) root.processWeights
.get(procNode.process)).intValue();
path.path = (ArrayList) pathAbove.path.clone();
path.path.add(root);
evaluatePath(procNode, path);
int pathAvg = findPathAverage(path);
if (bestPath == null)
bestPath = path;
else if (pathAvg > bestAvg)
{
bestPath = path;
bestAvg = pathAvg;
}
}
return bestPath;
}
private final int findPathAverage(PathInfo path)
{ // Use right shift to account for the fact that the path
// is twice as long as the number if entries in the total
// since we've counted processes in the path, but have not
// added any values for them
return path.total / (path.path.size() >> 1);
}
```

Figure 5 G

```
/**
 * No decisions are made when processing a processNode, we simply check to
 * see if we need to go deeper by processing the processNode's TMNode
 */
private final void evaluatePath(ProcessNode proc,
PathInfo pathAbove)
{
pathAbove.path.add(proc);
if (proc.tm != null)
{
PathInfo below = evaluatePath(proc.tm, pathAbove);
pathAbove.total = below.total;
pathAbove.path = below.path;
}
}
private static class PathInfo
{
int total = 0;
ArrayList path;
}
}
```

| User Type | Description |
|---|---|
| User Administrator | • Add/Edit/ Remove Users and Permissions |
| Shop Administrator | • Add/ Remove Lines<br>• Add/ Remove Processes<br>• Add/Edit/Remove Anchors<br>• Select Burden Values for a Process<br>• Add/Remove TM from Line<br>• Add/Remove Processes for TM in a Line |
| Burden Administrator | • Add/Edit/ Remove Burden Names for a Line |
| Scheduler | • Generate Schedules<br>• Mark TM as Absent/Present<br>• Mark TM's Processes as Modified or Normal<br>• Enter Sequence Number for Tracking |
| Report Viewer | • View Reports in the System<br>• No Access to Sensitive Information Reports |
| Burden Report Viewer | • View Sensitive Information Reports In the System (ie. High Burden Violation) |

FIG - 8

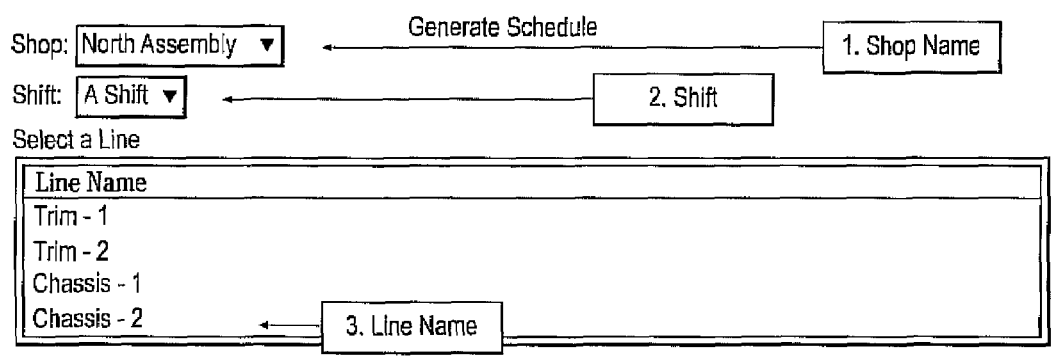

FIG - 10

Shop Administration

Line South Assembly - Trim 2 ← 1. Process Name

2. Burden Option → Hands

3. Burden Selection

Processes Burden

| Process Name | Neck | Back | Arms | Hands | Sitting |
|---|---|---|---|---|---|
| RH Pit | Low ▼ | High ▼ | Low ▼ | High ▼ | Medium ▼ |
| LH Pit | Low ▼ | High ▼ | Medium ▼ | Low ▼ | High ▼ |
| Floor Tube | High ▼ | Low ▼ | Low ▼ | Medium ▼ | High ▼ |
| Floor Brace | High ▼ | Low ▼ | Low ▼ | High ▼ | Medium ▼ |
| FR Brake Tube | Low ▼ | High ▼ | High ▼ | Low ▼ | Low ▼ |

Done

FIG - 19

Example of Burden Values

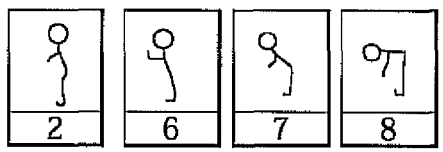

| Rate | Criteria |
| --- | --- |
| H - High | > 50% of Cycle |
| M - Medium | 30-49% |
| L - Low | <30% |

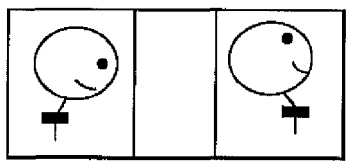

| Rate | Criteria |
| --- | --- |
| H - High | > 50% of Cycle |
| M - Medium | 30-49% |
| L - Low | <30% |

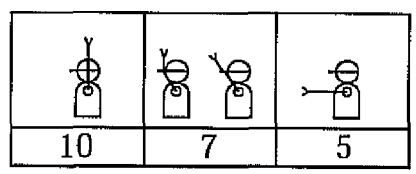

| Rate | Criteria |
| --- | --- |
| H - High | > 50% of Cycle |
| M - Medium | 30-49% |
| L - Low | <30% |

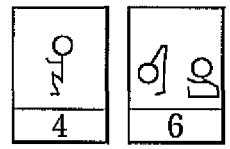

| Rate | Criteria |
| --- | --- |
| H - High | > 50% of Cycle |
| M - Medium | 30-49% |
| L - Low | <30% |

| Arm ||
| --- | --- |
| Rate | Criteria |
| H | Red Burden |
| M | Yellow Burden |
| L | Green Burden |

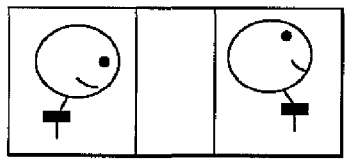

| Rate | Criteria |
| --- | --- |
| H | > 50% of Cycle |
| M | 21-49% |
| L | <20% |

| Back Burden ||
| --- | --- |
| Rate | Criteria |
| H - High | Red Burden |
| M - Medium | Yellow Burden |
| L - Low | Green Burden |

FIG - 20

SYSTEM AND METHOD FOR OPTIMIZING MANUFACTURING WORKFORCE

BACKGROUND OF THE INVENTION

1. Field of the Invention

A method and system for facilitating the optimization of manufacturing workforce while reducing workforce boredom in an assembly plant having multiple assembling tasks and workers.

2. Description of the Prior Art

Manufacturing plants are often required to perform repetitive tasks in order to mass assemble a product or part. The repetition can lead to boredom in the workforce as workers may find themselves performing the same motions day in and day out. This repetition may cause workers to day dream or become otherwise unfocused which in turn can cause some workers to become unsatisfied with their job.

Such plants are dynamic in operation and require a lot of workforce supervision in order to maintain an efficient productivity level. Accordingly, managers and floor leaders need to spend as much time on the plant floor as possible so as to conduct quality control inspections and maintain productivity. However, quality control and productivity are not the only responsibilities of Team leaders and managers. Team leaders and managers are also required to provide reports regarding various aspects of the workplace for which they are assigned. Additionally, team leaders and managers are also given the responsibility of assigning workers to assembly tasks. These can be a time consuming efforts and takes away from their time on the floor and for other administrative matters.

Methods and systems for facilitating the optimization of workforce and workflow in a manufacturing plant or office are well known and documented. U.S. Publication No. 2002/0065700 to Powell et al. discloses a method for allocating personnel and resources to efficiently complete diverse work assignments. The method begins by receiving work assignments then classifying the work assignment as either a service assignment or a pooled assignment. All work assignments are placed in a respective service assignment or pooled assignment queue. A schedule is then created for each individual work force member according to the assignments within the service assignment queue. The schedules are examined and periods of availability or slack times are identified and available resources are then assigned to the pooled assignment queue.

U.S. Pat. No. 5,111,391 to Fields et al. discloses a system and method for making staff schedules talking into account available resources as well as employee skill level and availability, and job priority. Specifically the staff scheduling data processing system and method schedules staff and management personnel at locations remote from a central location and applies central location policy to those remote locations to ensure optimum staff schedule and regulatory compliance for each site. A schedule is created for a given day from a remote location using the database and the schedule is submitted to various locations where the tasks are to be performed. The schedule takes into account the tasks that are available and the tasks that are needed to be performed and the employees that are available to perform the tasks.

U.S. Pat. No. 5,093,794 to Howie et al. discloses an improved job scheduling method and system for scheduling a variety of jobs. Specifically, Howie et al. teaches a method of scheduling work based upon the estimated time required to complete a specific job and then scheduling jobs in accordance with each job's estimated time requirements. The system takes into account the time sensitivity of the jobs and the preferred path a job should take through a shop so as to schedule the jobs around identified bottleneck areas of the shop. Additionally, the system executes various queries to help further move a job through the shop. The system includes a planning mode where the estimated target date for each work order and operation within the work order fed into a work order tracking system. Jobs are entered along with a sequential list of operations to be performed on each workpiece. The list may be interactively updated by the operator to accommodate scheduling through shop bottlenecks by imposing tighter constraints on the bottleneck operations such as starting the workpiece later or earlier. An operational mode is provided that uses weighted tardiness measures established in the planning mode to support decisions with regards to the movement of the work order through the shop. A time map is generated that displays where the workpiece should be within the shop at any given time from the work order to completion, for each work order part.

However, neither Powell et al., Howie et al., nor Fields et al. disclose a method whereby the attention of a worker is maintained by ensuring the worker receives varied assembly tasks. Accordingly, it is desirable to have a method that can save a team leader or manager time while both stimulating workforce personnel intellectually with varied activity to maintain plant productivity and product quality.

SUMMARY OF THE INVENTION AND ADVANTAGES

A method and system for facilitating the optimization of manufacturing workforce and reducing workforce boredom in an assembly plant having multiple assembling tasks and workers. All of the workers assigned to work in the assembly plant are stored in a master database along with all of the assembly tasks required to be performed at the assembly plant for a predetermined period. The master database also includes a repetitive threshold value for each worker, and a burden value for each assembly task. Each worker is assigned to a particular assembly task based upon the attributes of the worker and the assembly task requirements. A first schedule is generated by matching assembly tasks to a worker. The first schedule is then used to generate a second schedule such that workers do not exceed a repetitive value threshold or a burden value threshold. Subsequent schedules can be generated such that the workers do not exceed the repetitive threshold value or burden value threshold when factoring the preceding schedule. Thus the method provides a way of generating schedules such that workers are given a variety of assembly tasks and therefore are not bored by performing the same task repetitively.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2b is a continuation of the flow diagram of FIG. 2a;

FIG. 3 is representation of a scheduled generated using the greedy algorithm of FIG. 3;

FIG. 5 is FIGS. 5a-5g are the code for the tree-based algorithm of FIGS. 4a and 4b;

FIG. 6 is an architectural layout of the hardware supporting the system;

FIG. 8 shows the different kinds of access each user is assigned as well as a description of the powers associated with each access;

FIG. 10 is a screen shot of the first page of the "Generate Schedule" webpage showing the kind of information needed for the system to create a schedule;

FIG. 19 is a screen shot of the "Burden Modification" webpage, each process is assigned a burden based upon the physical motions which the process requires a worker to perform, the assigned burden may be modified to reflect a change in the process; and FIG. 20 is burden assignment model showing how a motion, or posture, is assigned a burden value.

DETAILED DESCRIPTION OF THE INVENTION

Figure 1:
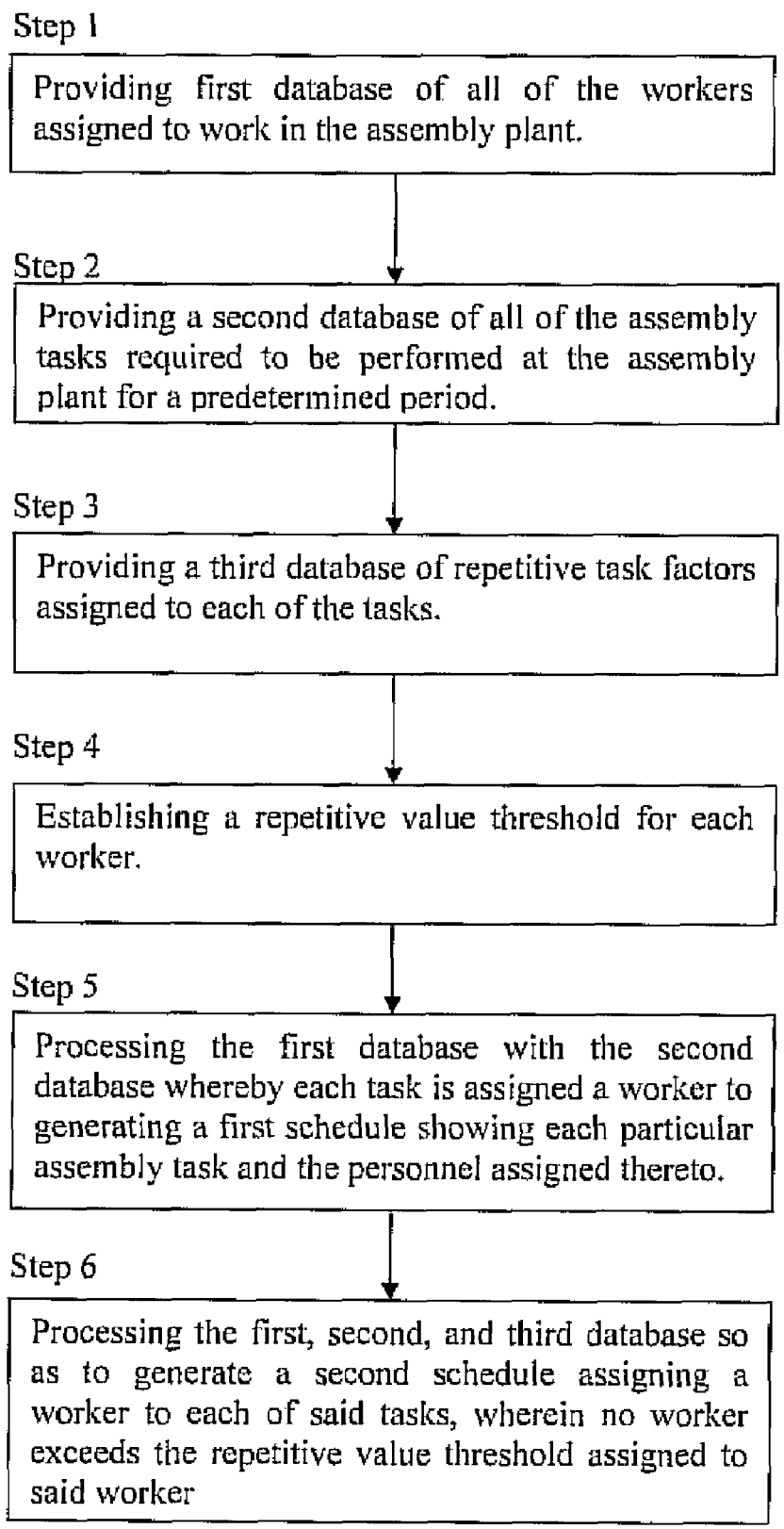
FIG. 1 is diagram showing the steps of a method for facilitating the optimization of manufacturing workforce and reducing workforce boredom in an assembly plant.

With reference to FIG. 1 a method 10 for facilitating the optimization of manufacturing workforce and reducing workforce boredom in an assembly plant having multiple assembling tasks, and workers is provided. The method 10 includes the steps of establishing a master database. The master database includes a first database of all of the workers assigned to work in the assembly plant, a second database of all of the assembly tasks required to be performed at the assembly plant for a predetermined period of time, and a third database of repetitive task factors assigned to each of the tasks. The next step is to establish a repetitive value threshold for each worker. The method then proceeds to processing the first database with the second database whereby each task is assigned a worker to generate a first schedule showing each particular assembly task and the personnel assigned thereto. Finally, the method ends after the first, second, and third database are processed so as to generate a second schedule wherein worker is assigned to each of said tasks such that no worker exceeds the repetitive threshold value.

The assembly task, also referred to as a job or process, is generally one of a series of sequentially ordered steps within an assembly line. The assembly line is formed from a series of assembly tasks arranged in a sequential manner so as to progressively build a desired part or product. The shops are set up to perform in shifts, and each shift is further divided into periods. This helps managers and team leaders break-up the monotony of work by scheduling workers to perform different processes during each period within the shift. Each shop is assigned at least one assembly line for which shop workers are directed to complete. Each worker is assigned to a particular assembly task, and a schedule for the line is generated showing each particular assembly task and the worker assigned thereto. The method automatically creates a schedule using an algorithm that helps ensure that personnel are assigned to a different assembly task when generating a subsequent schedule by establishing a repetitive value threshold (RVT). The RVT is a predetermined acceptable value of the sum of the repetitive task factors. The repetitive task factor is based upon what an individual needs to be intellectually stimulated to ensure that the individual is intellectually engaged with the task at hand and not bored and inattentive. Thus, the repetitive task factor may be based upon studies of workers and their job performance or it may be assigned based upon the nature of the task. For instance, an assembly task requiring a worker to turn a screw might have a repetitive task factor of 1 as turning a screw does not require much thought. However, an assembly task requiring a worker to perform an inspection might have a repetitive task factor of 10 as the task requires more thought. Thus, it may be preferable to ensure that workers do not exceed an RVT of 13 within consecutive work assignments, thereby helping to reduce work boredom by scheduling workers such that they are not given two consecutive tasks requiring providing little intellectual stimulation.

To ensure that the assembly tasks are performed in the best manner possible, the method 10 may include providing the first database with the training skills and physical limitations of each worker. The second database may also be provided with the training skills and physical abilities best suited to accomplish each assembly task. The first and second database is then processed to assign each task to a worker by matching the training skills and physical abilities of a particular worker to the training skills and physical abilities best suited to accomplish a particular task. Preferably the first and second databases are processed by a computer processing unit executing a software program. However, this can be done manually as well. For instance, a scheduler can look at the attributes of each worker and the requirements of a particular assembly task when generating a schedule. Thus a scheduler, such as a manager or a shift leader, can assign worker who have been trained in material handling of a fender to an assembly task requiring such training.

The master database may also include a fourth database of burden values for each of the assembly tasks. Each burden value relates to the physical demands that a particular task places on the worker performing the task. An example of burden values is provided in FIG. 20. The method may further include the step of establishing a burden value threshold (BVT). The BVT is a predetermined acceptable value of the sum of the burden values. As shown in FIG. 20, the burden value is based in part upon the motions a particular assembly task requires a worker to do, whether the task requires heavy lifting, and the like. For instance, FIG. 20 shows that a high burden value of 3 is assigned to an assembly task where a worker must hold his/her head up more than fifty percent of the time during the task, but has a low burden value of 1 when the head is lifted less than thirty percent of the time during an assembly task. A medium burden value of 2 is assigned to tasks where a user's head is lifted more than thirty percent of the time during an assembly task but less than fifty percent of the time. It may be preferable to ensure that workers do not exceed a BVT of 5 within consecutive work assignment as that may lead to worker fatigue further resulting in inattentiveness. For example, using the above burden values, a worker is able to move from a high burden value task to a low burden value task, or a medium burden value task to another medium burden value task but would be precluded from moving from a high burden value task to a medium burden value task or another high burden value task.

The method 10 also includes the step of identifying personnel that are absent from the workplace or otherwise unable to perform a particular assembly task. This information may be automatically transmitted or made otherwise available to a scheduler. The scheduler is able to adjust the schedule to ensure that production is not disrupted upon learning that a particular worker is absent or otherwise unable to perform assembly tasks. Thus this step helps optimize workforce and production by ensuring that assembly tasks are assigned sufficient personnel to ensure proper and efficient completion.

The method 10 further includes alerts or reports to a scheduler or other designated personnel of scheduling conflicts, instances where a worker exceeds an RVT or BVT within a predetermined period, or other scheduling problems. For instance, a report may be generated notifying a user of instances when particular worker has been assigned to the same assembly task a predetermined number of times within a predetermined work period; when a particular worker has been assigned the same assembly task consecutively; or when workers have been assigned consecutive assembly tasks or a predetermined number of assembly tasks that have demanding physical requirements within a given period. Thus the method 10 helps ensure that workers are given a variety of tasks to help maintain the interest of each worker and helps minimize each worker's exposure to prolonged and repetitive physical demands. The reports can also provide information on each product made within the assembly plant and the worker responsible for a particular assembly task associated with a particular manufactured part or product.

Figure 2A:
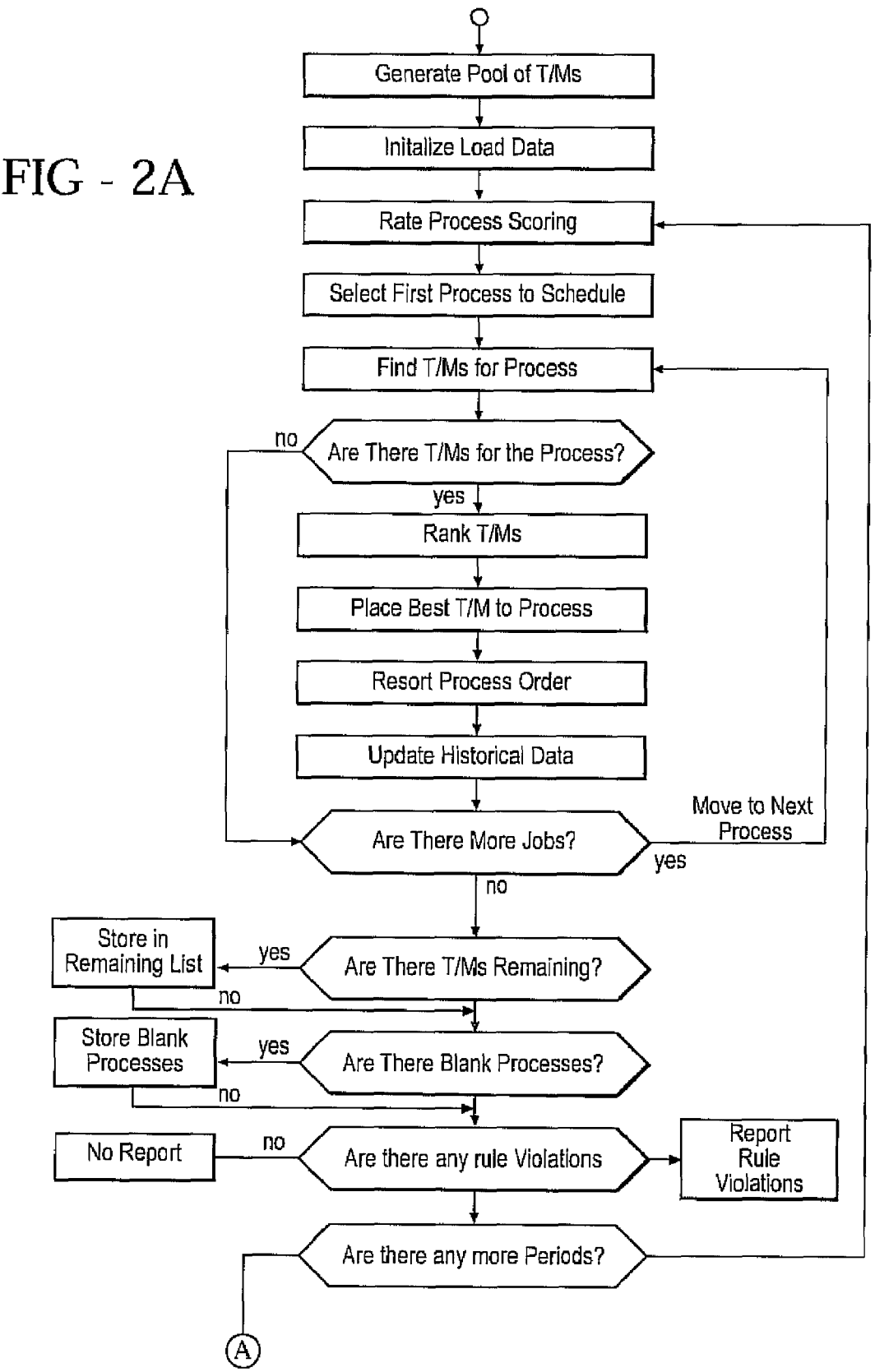
FIG. 2a is a flow diagram of a greedy algorithm used to create a schedule, the greedy algorithm contains a series of rules and notifies the user if a rule was violated when creating the schedule.
Figure 2B:
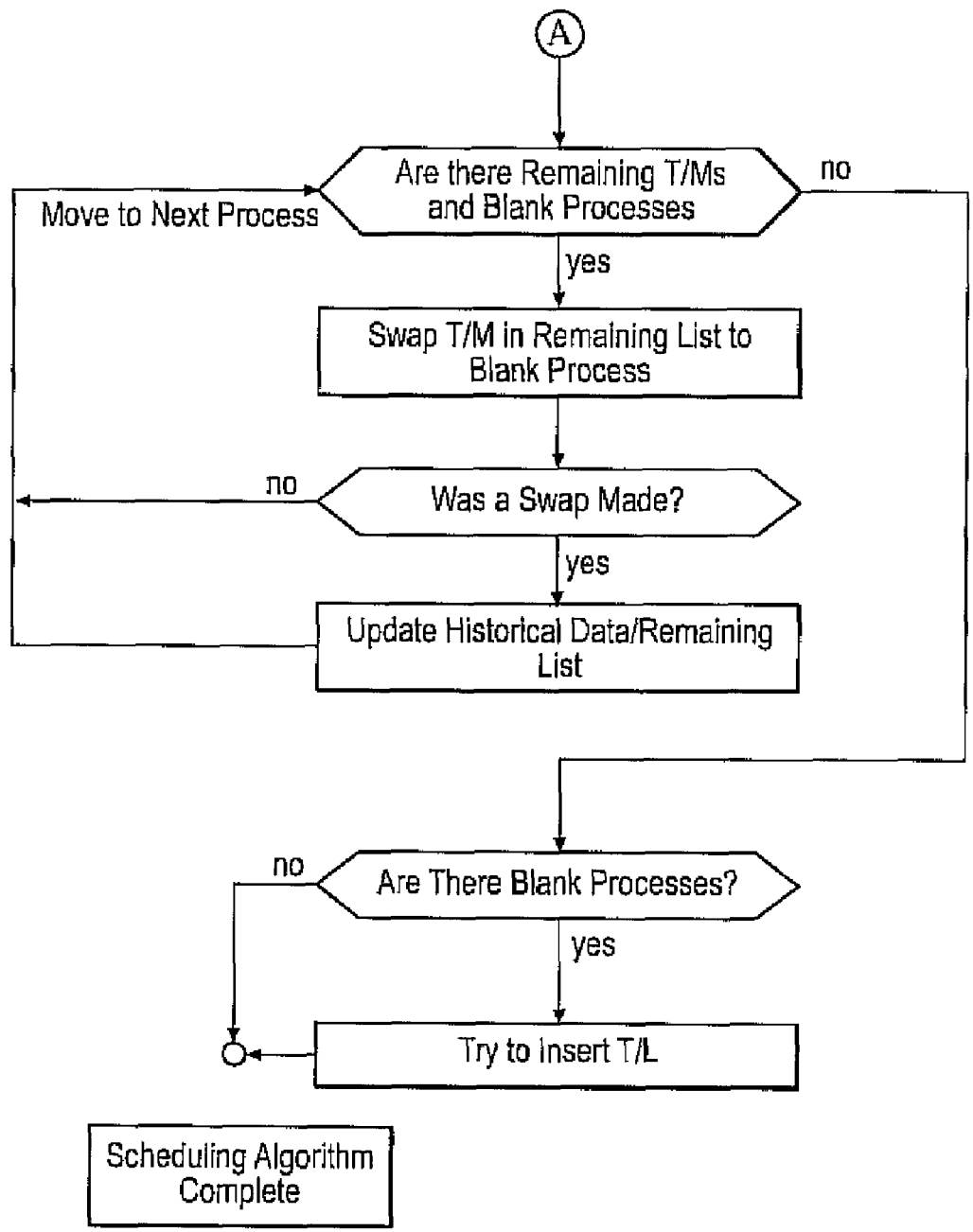

In a first preferred embodiment, a greedy algorithm is used to create and analyze a schedule to ensure that personnel are assigned to a different assembly task when generating a subsequent schedule. With reference to FIG. 2a, the flow diagram of a greedy algorithm is shown. The algorithm uses database information and user input to generate a schedule for each period within a shift. The greedy algorithm first rates the available processes by which is the hardest to fill. This can be based upon numerous factors such as the physical requirements of the process, to the specialized training needed to complete the process. These processes are then filled by workers having attributes which match the requirements of said processes. The list of processes is updated to reflect the recently made assignment, and the algorithm continues in this manner until all the processes have been assigned a worker and generates a schedule as shown in FIG. 3. If the created schedule contains a rules violation, i.e., exceed the RVT, BVT, a worker is assigned the same task consecutively, etc, notification is sent to the user.

Figure 4A:
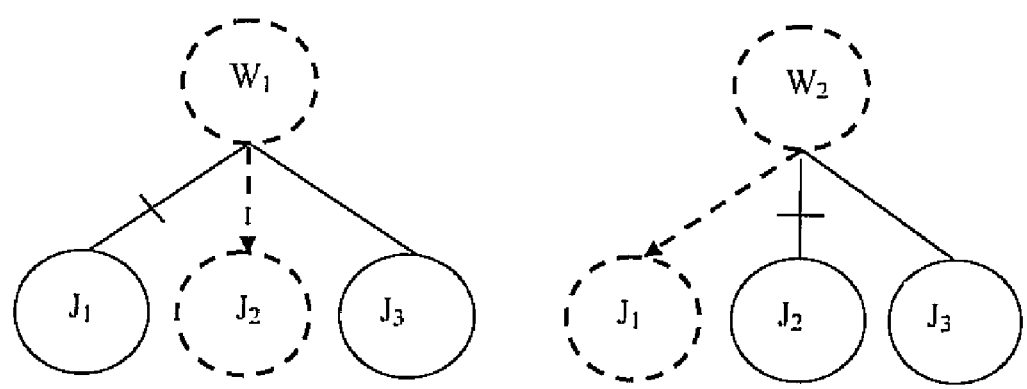
FIG. 4a is a graphical representation of the tree based algorithm used to create a schedule, as seen the rules based algorithm treats the workers and processes as nodes and creates a weighted path (indicated by the dashed lines) from a worker to a process is totaled and used determine the optimal schedule generated.
Figure 4B:
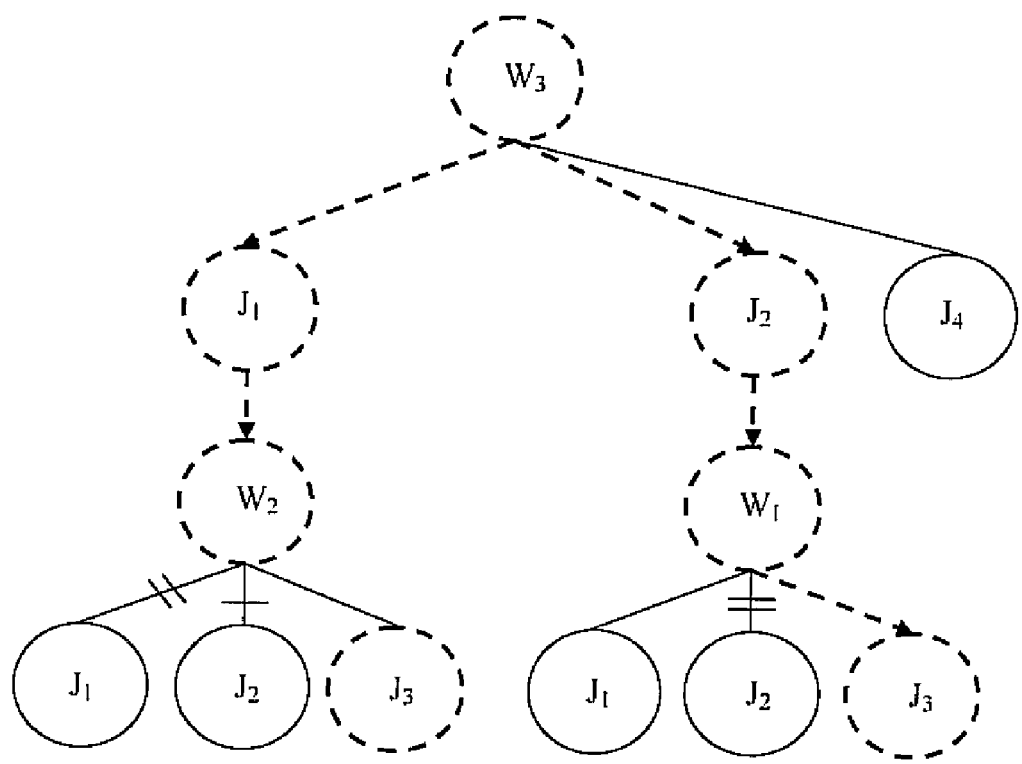
FIG. 4b is a graphical representation of the mapped path of a generated schedule, the total value of each of the paths are compared and the optimal path value is selected by the algorithm.

In a second preferred embodiment, a tree-based algorithm, also referred to in the art as graph-based algorithm, is used to generate and analyze a schedule to ensure that workers are assigned to a different assembly task when generating a subsequent schedule. With reference to FIGS. 4a and 4b, diagrams of the tree-based algorithm are shown. With reference to FIGS. 5a-5g, the code for a tree-based algorithm is provided. A single worker, represented by a node, is placed at the top of the tree with the jobs for which the worker is trained to do, is placed below. The jobs are also represented by a node. Jobs are then scheduled for each worker by mapping the two nodes together such that the jobs and workers are all interconnected by the line having a weighted value, providing a path as shown in FIGS. 4a and 4b. This operation is performed for all possible work schedules, and the path providing the least weighted value is selected-assuming that the least weighted value is optimal. A schedule is complete when the path arrives at either an unscheduled job or a job which appears above the node.

With reference to FIG. 4a, worker 1 is shown trained in jobs 1, 2, and 3. The dashed path between worker 1 and job 2 shows that worker 1 is scheduled to work in job 2. The single line crossing through the dashed line connecting worker 1 with job 1 indicates that the path is not available. This may be because the job was previously scheduled or worker 1 is physically unable to perform that particular job. The double lines crossing the path represent the termination of a path caused by the job appearing above the node, thus the node below the line would not be included in the path selection phase of the algorithm. With reference to worker 2 of FIG. 4b, worker 2 is trained in jobs 1, 2, and 3, and is shown scheduled to work job 1.

With reference to FIG. 4b, the tree-based algorithm creates a schedule by first selecting a worker and then attempts to find a job to schedule the worker to perform. Workers which have been scheduled are then reconsidered to see if moving them to a different job for which they are trained would create a more optimal schedule. This is determined by giving each path a value, and adding the total value of that particular path. The total value of each of the different paths generated is then compared and the lowest value is chosen, assuming that the lower value correlates to an optimal schedule.

With reference again to FIG. 4b, suppose that the weighted value of a particular path ranges from 1 to 3 with 3 being the optimal value. Suppose that the weighted value of the path from worker 3 to job 1 is 3 and the weighted value of the path from worker 2 to job 1 is 2, the total value of the path is 5. Suppose the weighted value of the path from worker 3 to job 2 is 1 and the weighted value of the path from worker 1 to job 3 is 2, the total weighted value for that path is 3. Thus according to the optimal ranges set forth in the supposition provided, the tree-based algorithm would choose the schedule having the total weighted value of 5 as it reflects a more optimal schedule.

With reference now to FIGS. 6 through 20, a system 12 for optimizing manufacturing workforce and reducing workforce boredom in an assembly plant having multiple assembling tasks and personnel is shown. The system 12 may be a standard Java enterprise edition web application 18 that is accessible to users through a secure network via a standard web browser 20 such as Microsoft internet explorer, or Moxilla Firefox. An architectural layout of the application 18 is provided in FIG. 6. The system 12 includes a database 16 for storing a list of all personnel and attributes thereof assigned to the assembly plant and a list of all assembly tasks and requirements thereof to be completed at the assembly plant. A computer processing unit 22 hosting and executing the web-based application 18 is in communication with the database 16 and allows designated users to interface with the system 12 to perform tasks such as editing attributes of the workforce personnel, or assembly task requirements, modifying schedules, and the like.

Figure 7:
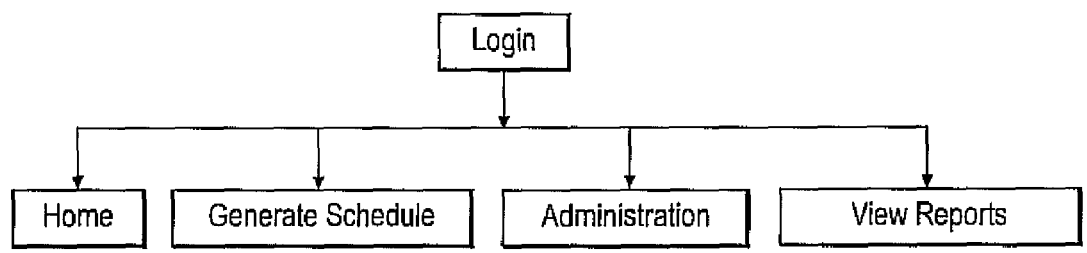
FIG. 7 shows a diagram of the web-based application, specifically, users after logging in are able to generate a schedule, make administrative changes to the database, and view reports.

With reference to FIG. 7, the web-based application 18 is accessible through a log-in page, which requires users to provide their password and user identification. Once proper user identification and password have been submitted, the application 18 takes the user to a home page where links to other web pages of the application 18, such as a page to generate schedules, an administration page, and a page where reports 14 may be generated and viewed. Each user will be assigned a level of access which determines the contents of each page available to that particular user as shown in FIG. 8. Users are able to access a desired web-page by simply clicking a mouse on the respective link.

Figure 9:
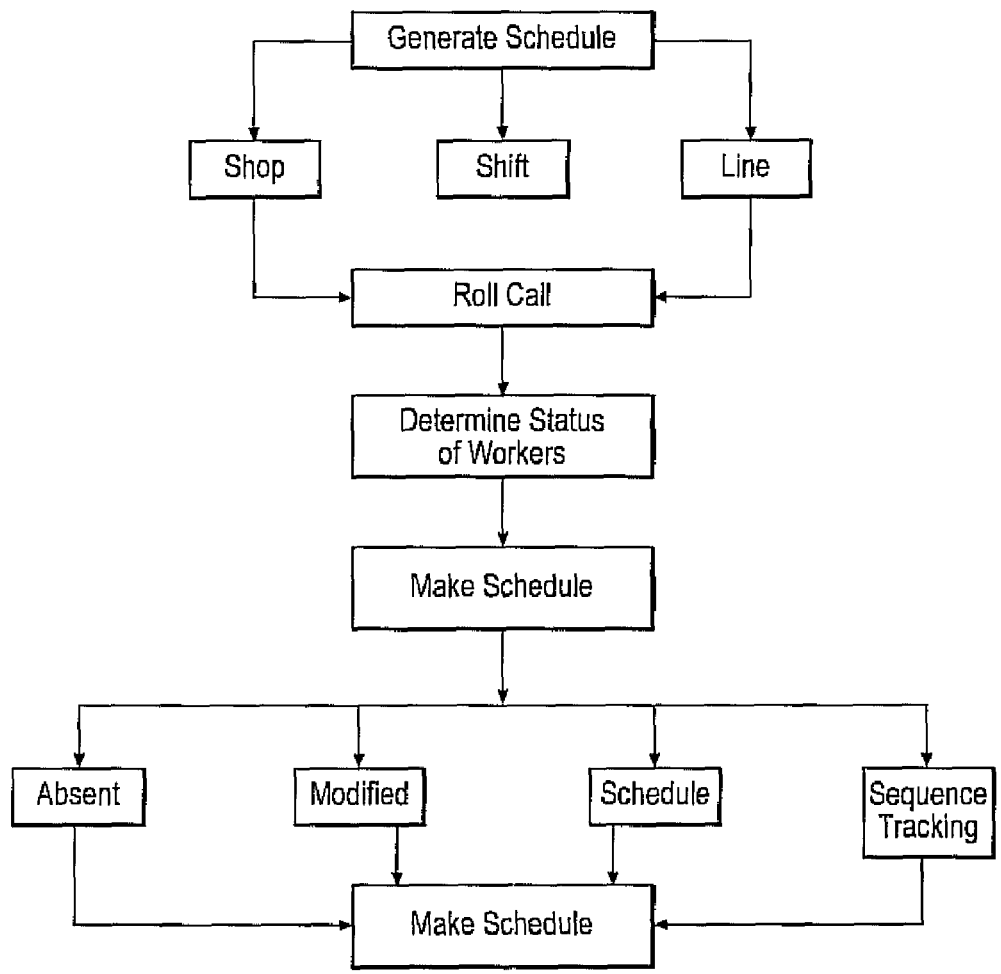
FIG. 9 is a diagram of the "Generate Schedule" webpage, the user is directed to provide certain information needed for the algorithm to create a schedule, the diagram shows that the user is able to modify the created schedule as desired.
Figure 11:
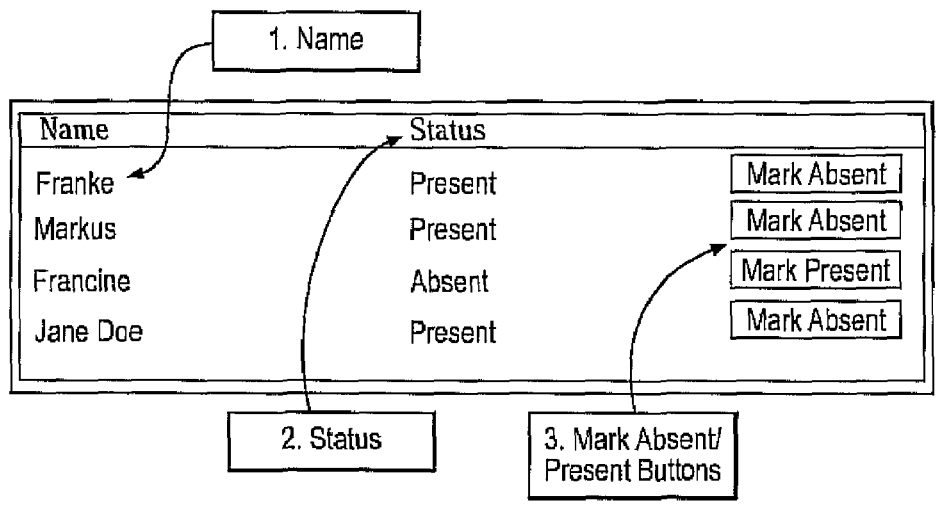
FIG. 11 is a screen shot of the "Roll Call" webpage wherein the system is able to create a more accurate schedule by having the user identify who is present.
Figure 12:
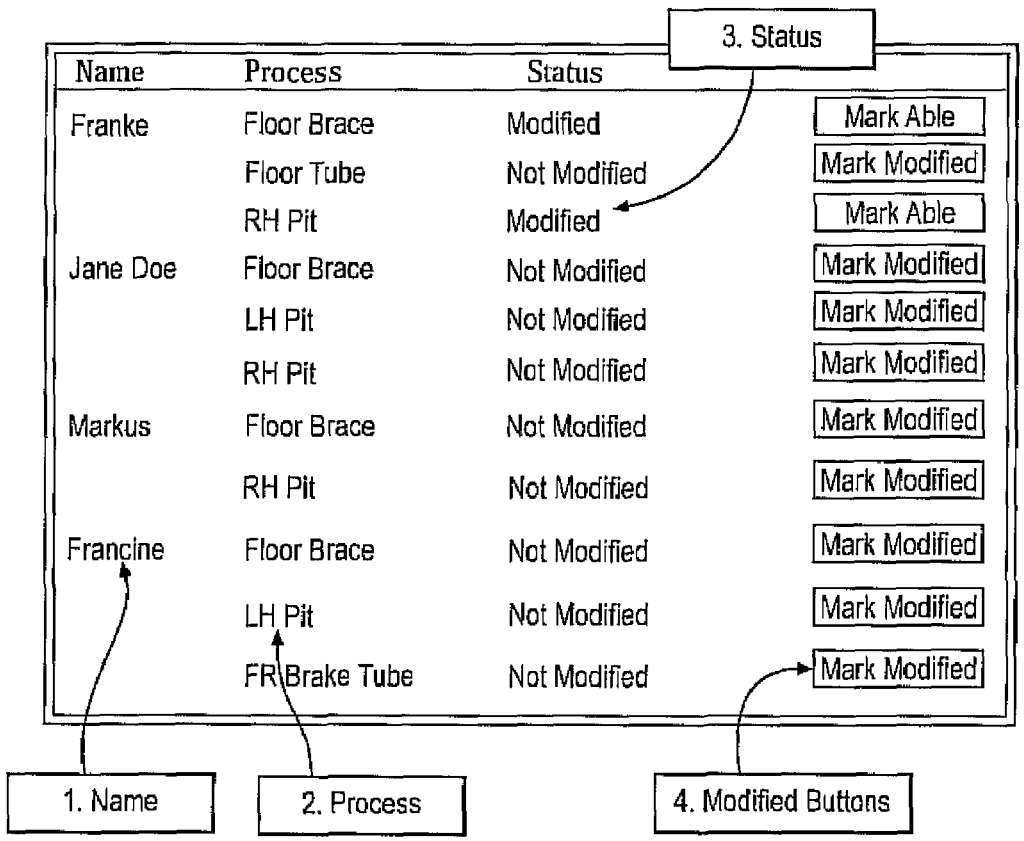
FIG. 12 is screen shot of the "Determine Status" webpage wherein the system uses information regarding a worker's physical abilities to generate a schedule.

With reference now to FIGS. 9 and 10 a screen shot and flow diagram of the schedule page are provided. The schedule generating page is designed to provide the user with information necessary to create a schedule as well as extract the necessary information from the user thereby streamlining the schedule creating process. Specifically, the user is required to enter the shop, shift, and line for which the schedule is to be made. The application 18 then communicates with the system database 16 to extract the worker assigned to the respective shop, shift and line. Once that information is entered, the roll call page is displayed as seen in FIG. 11. The roll call page allows the user to mark whether the worker is present or absent. Once roll call has been made, the system 12 directs the user to a page where the status of the workers may be marked, as shown in FIG. 12. Specifically, the system 12 is interested in learning if the worker's physical ability to perform tasks has been modified. After the user has completed marking the status of each player, the application 18 executes a scheduling algorithm 24 which creates the schedule for the shift of the shop line in a separate webpage, as shown in FIG. 13

Figure 13:
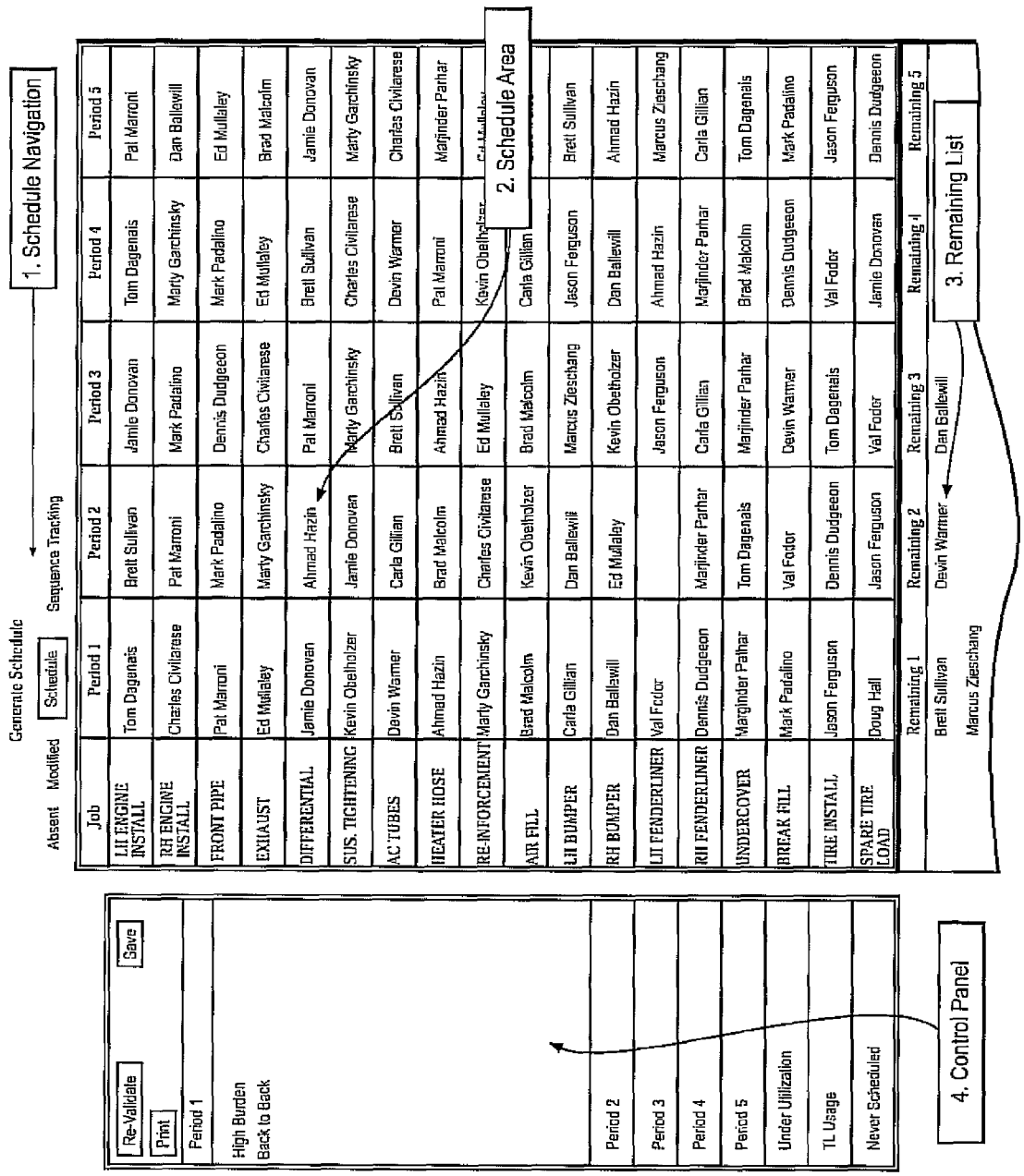
FIG. 13 is a screen shot of a schedule created by the system after the user has entered information into the "Roll Call" and "Determine Status" webpages, as shown, a control panel is provided to notify the user of errors or potential conflicts within a particular period.

As shown in FIG. 13, the shift is further divided into different periods, this allows for management to arrange the assembly tasks of each worker in order to help reduce workforce boredom by providing the worker with a variety of tasks to accomplish during the shift. This can be done using the scheduling algorithm 24 which contains rules for schedules and determines if a generated schedule has violated any of those rules. As stated above, the rules are directed towards identifying whether a worker has been scheduled the same job consecutively; consecutive jobs with high burdens; or if there has been a worker assigned the same job a predetermined number of times within a given time frame.

Figure 14:
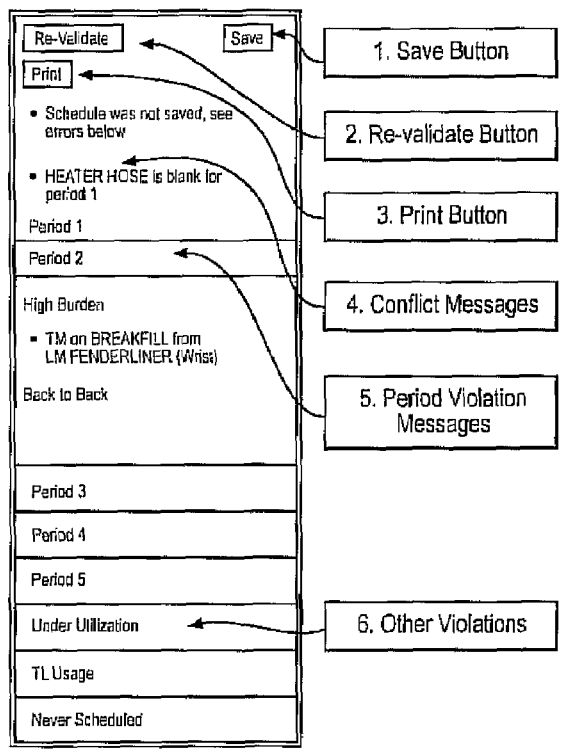
FIG. 14 is an isolated view of the control panel of webpage showing the created schedule, the created schedule for each period is accessible by a corresponding link.

Each period within the shift is provided with a list of workforce personnel and their respective jobs. The schedule web page has interactive features which facilitate the modification of the created schedule, and a control panel which displays information regarding each period. Information relating to each period is displayed within the control panel which is accessible by clicking onto the tab labeled with the desired period. The control panel will display any potential problems associated with the created schedule. An isolated view of the control panel is shown in FIG. 14. For illustrative purposes, the control panel shown in FIG. 14 displays "period 1" and has identified that "period 1" has generated an instance where workforce personnel have been assigned the same job in consecutive shifts (back-to-back scheduling) and workforce personnel have been assigned jobs consecutive jobs having high burden requirements.

The user can adjust the created schedule by simply clicking onto a worker and dragging that worker into a different job. The schedule web page also contains a linked tab labeled "make" with each period. This allows the user to regenerate a schedule for that period and any subsequent period. Thus, if the user is satisfied with the first period and desires to change the schedule of the second period, the user can make the desired changes to the second period and click "make" for the third period which will then regenerate a schedule for periods three through four while maintaining the saved changes of periods one and two. The subsequent periods will be generated using the scheduling algorithm 24 to help prevent the occurrence of back-to-back scheduling or high burden to high burden scheduling.

At any time, the user can "re-validate" a created schedule, meaning the user can identify whether any rules have been broken, or if any rules violations were corrected after a user manually modified a schedule. Once the user is satisfied with the schedule, he or she can simply click on the link labeled "save" to save the schedule. All of the saved schedules are stored in the system's database 16 to later create reports 14. With reference again to the flow diagram of FIG. 9, the created schedule can be further amended to reflect the absence of a worker or the change in a worker's status by clicking onto a link titled "absent" and "modified" respectively.

Figure 15:
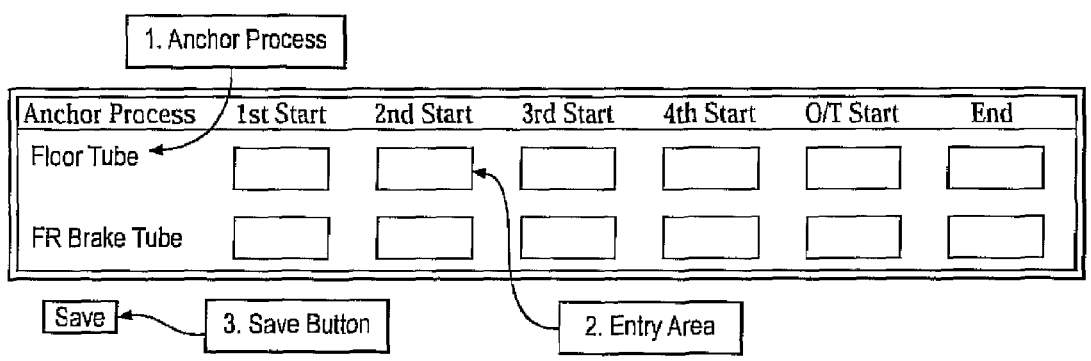
FIG. 15 is a screen shot of the "Sequence Tracking" webpage, as shown, the web-based application directs the user to input information necessary to track products as they are assembled along the manufacturing line.
Figure 16:
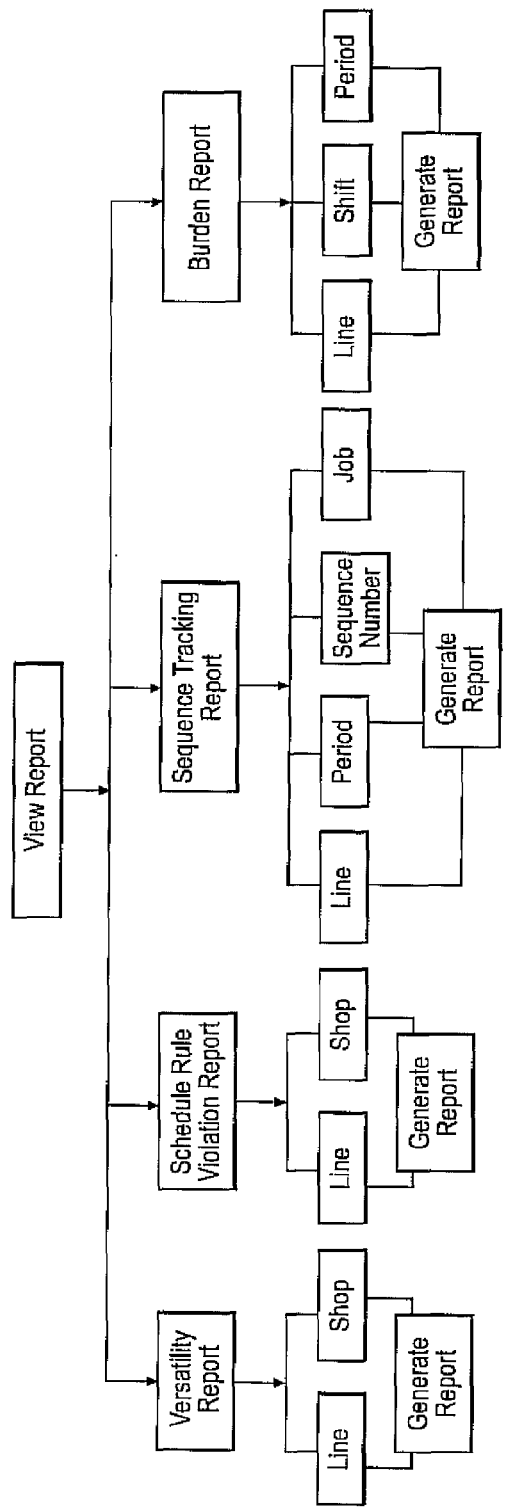
FIG. 16 is a diagram of the "View Report" webpage, as shown a variety of reports may be generated and the application directs the user to input information necessary to generate each report.

Another link labeled "Sequence Tracking" is also provided. In an assembly plant, each product produced is assigned a number, with subsequent parts being assigned a part number in a numerically ascending order. The part number is useful because it allows designated users the ability to determine who was responsible for the assembly of a particular part. This can be done by simply monitoring the product as it progresses through the assembly line using the product number. As shown in FIG. 15, the product number for a floor tube is entered into the "$1^{st}$ Start" column, the "starts" reference each period within a shift. Thus if it is determined that the floor tube of product number was assembled defectively, the person responsible for the defective assembly can be identified by looking at who was assigned the floor tube process during that particular period. This is an extremely valuable tool from a quality control standpoint as managers can quickly isolate the cause of an assembly error and retrain the worker to ensure future errors are avoided As stated above, the home page includes a link labeled "View Reports." A flow diagram of the "View Reports" webpage is provided in FIG. 16. View Reports allows user to view different reports 14 concerning the schedules by clicking on the desired tab. In the first and second preferred embodiment, a user is able to view a versatility report 14, back-to-back job report 14, sequence tracking report 14, and a burden report 14. However, it is anticipated that other reports 14 may be generated and thus a webpage facilitating the creation of other reports 14 is available. For instance, a report 14 could be generated that informed the user of how many absences workers have in any given period, or what workers have had a change in their physical abilities, and the like. Each report link takes the user to a different webpage where the user is directed to answer questions necessary to generate the desired report 14. For example, if the user wants to see how many instances occurred where workers were assigned consecutive process having high burdens the "Burden Report" webpage directs the user to identify the line, shift, and the time frame of interest.

Figure 17:
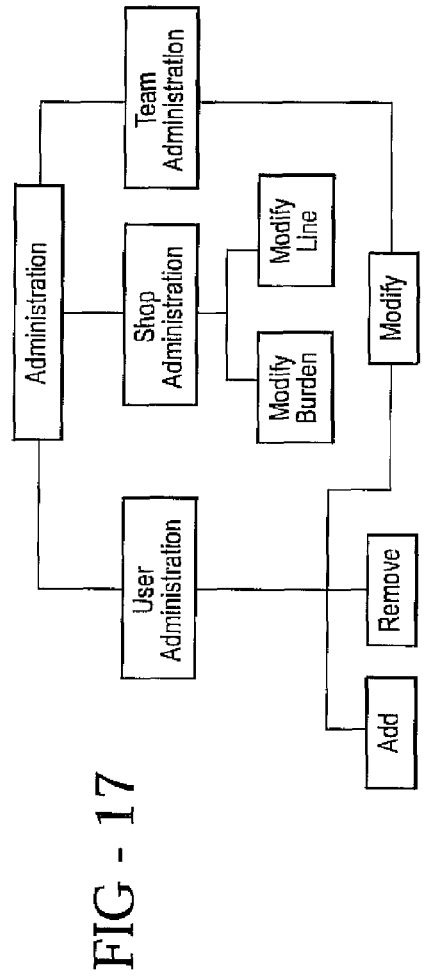
FIG. 17 is a diagram of the "Administration" webpage, as shown there are three administrative matters which may be handled.
Figure 18:
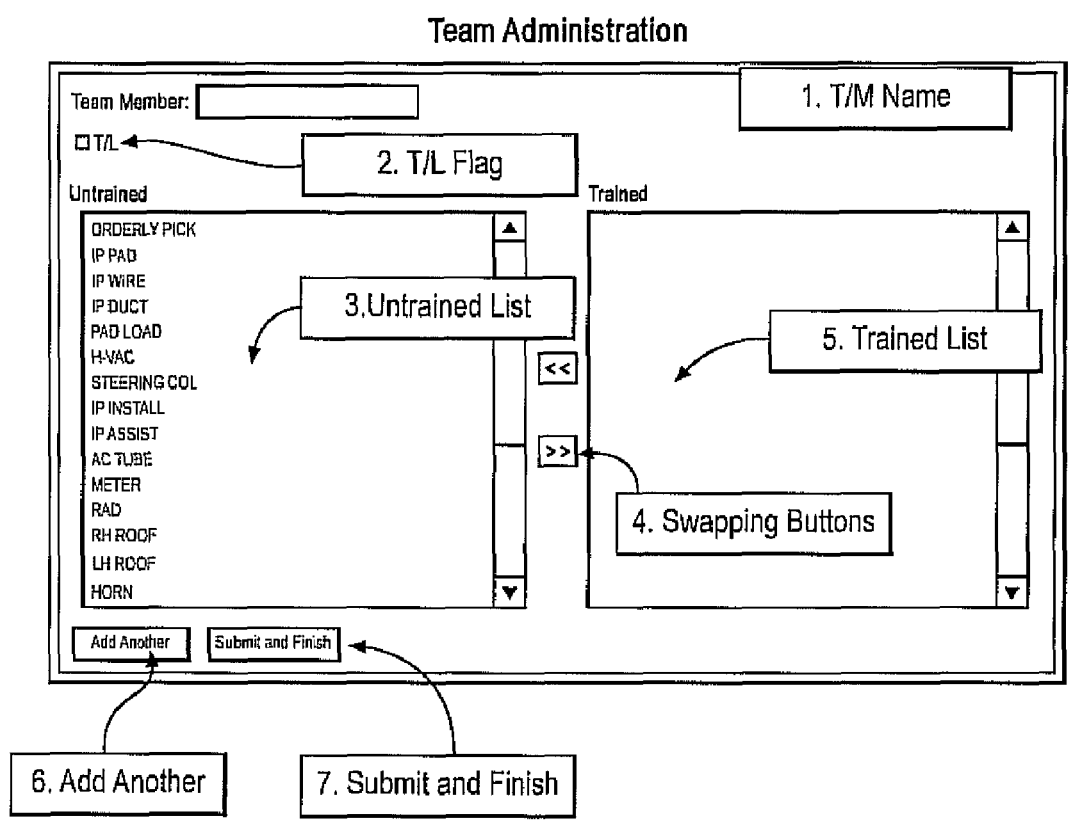
FIG. 18 is a screen shot of the "Team Administration" webpage, as shown, users are able to identify the training qualifications of each worker.

As stated above, the home page includes a link labeled "Administration." The "Administration" webpage allows designated users to change the information stored in the database 16. As seen in FIG. 17, the information is stored in three different categories: User Administration; Shop Administration; and Team Administration. The "User Administration" webpage allows designated personnel to modify, add, and delete workforce personnel. The "Team Administration" webpage allows designated personnel to modify existing workforce personnel. As mentioned above, each worker's physical status and abilities are recorded when generating a schedule. The system 12 allows the user to assign other attributes to each worker as well. FIG. 18 shows a screen shot of a "Team Administration" webpage where the user is able to select training qualifications from a list within a panel marked "Untrained" and move the selected training qualification to a panel marked "Trained" denoting that the worker is trained in that selected area.

The "Shop Administration" webpage allows designated users to modify, add or delete lines as well as processes, and the burden associated with each process. With reference now to FIG. 19, a screen shot of the burden modification webpage is provided. As seen in FIG. 19, each process within a line is identified, and the ergonomic burden the process imposes on a particular body part is provided. The user is able to change the ergonomic burden by simply clicking on the drop down icon and selecting the appropriate burden. This allows the system 12 to maintain accuracy despite changes made to reduce the physical demands of the assembly lines. For instance, a change may be made to a particular process which eliminates the worker's need to look up thereby decreasing the physical demands on a worker's neck. The designated user is able to easily modify the burden of the process thus keeping the system 12 current. The burden values are assigned using a standard chart which provides burden value based upon the motion a particular process requires the worker to perform. An example of the burden values is provided in FIG. 20. Thus the system 12 provides the user with an efficient means of detecting scheduling problems which might lead to boredom in the workplace, as well as provides users with tools to ensure quality of the manufactured products and facilitate workforce management.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A system for facilitating the optimization of manufacturing workforce and reducing workforce boredom in an assembly plant having multiple assembling tasks and workers comprising:

a first database storing all of the workers assigned to work in the assembly plant, all of the assembly tasks required to be performed at the assembly plant over a predetermined period of time, the first database further storing a plurality of repetitive task factors, a processor operable to calculate each of the repetitive task factors based upon a degree of inattentiveness a particular task induces on a particular worker;

the processor further operable to calculate the degree of inattentiveness using a work history of the particular worker, and a degree of attentiveness required for a particular task; the each of the plurality of repetitive task factors assigned to a respective one of the assembly tasks;

a repetitive value threshold for each worker, the processor calculating a repetitive threshold value for each worker, the repetitive threshold value based upon a degree of intellectual stimulation needed by a respective worker to remain attentive;

a processor in communication with the first database, the processor operable to generate a first schedule, the first schedule including each worker, each worker assigned more than one assembly task, the processor further operable to process the first schedule and total a value of repetitive task factors associated with every assembly tasked assigned to each worker so as to determine the total value of repetitive task factors for each of the workers, the processor further operable to compare the total value of repetitive task factors of each of the workers to determine if the total value of repetitive task factors exceeds the repetitive value threshold of a respective worker, the processor further operable to generate a second schedule, the second schedule reassigning assembly tasks to a worker in instances where the total value of repetitive task factors of a worker exceeds the worker's repetitive value threshold.

2. The system as set forth in claim 1, wherein the first database includes training skills and physical abilities of each worker.

3. The system as set forth in claim 2, wherein the first database includes training skills and physical abilities best suited to accomplish each assembly task.

4. The system as set forth in claim 3, wherein the processor is further operable to process the first database to assign each task a worker by matching training skills and physical abilities of a particular worker to the training skills and physical abilities best suited to accomplish a particular assembly task.

5. The system as set forth in claim 1, further including a burden value for each of said tasks, each of the burden value is calculated based upon physical motions the task requires a worker to perform.

6. The system as set forth in claim 5, further including a burden value threshold.

7. The system as set forth in claim 6, wherein the processor is further operable to process the first database so as to generate a second schedule assigning a worker to each of said tasks, wherein a worker exceeds neither the repetitive value threshold assigned to said worker, nor the burden value threshold.

8. The system as set forth in claim 4 or 7, further including the step of generating an alert if a second schedule contains an instance where a worker is scheduled a same assembly task in the first schedule, or if the second schedule contains an instance where a total burden value of a worker from the first schedule and the second schedule exceed a predetermined total of burden values.

9. The system as set forth in claim 1, wherein a greedy algorithm is used to process the first database with the second database to assign each task a worker thereby generating a first schedule, and then further processes the first database so as to generate a second schedule assigning a worker to each of said tasks, wherein no worker exceeds the repetitive value threshold assigned to said worker.

10. The system as set forth in claim 1, wherein a tree-based algorithm is used to process the first database to assign each task a worker thereby generating a first schedule, and then further process the first database so as to generate a second schedule assigning a worker to each of said tasks, wherein no worker exceeds the repetitive value threshold assigned to said worker.

* * * * *

UNITED STATES PATENT AND TRADEMARK OFFICE
CERTIFICATE OF CORRECTION

PATENT NO. : 8,140,369 B2  
APPLICATION NO. : 12/195466  
DATED : March 20, 2012  
INVENTOR(S) : Robin Paul et al.

Page 1 of 1

It is certified that error appears in the above-identified patent and that said Letters Patent is hereby corrected as shown below:

Column 1, line 30, after be, delete "a"

Column 1, line 48, delete "talking", insert --taking--

Column 2, line 66, delete "scheduled", insert --schedule--

Column 3, line 2, after schedule, delete ",", insert --.--

Column 3, line 2, delete "as", insert --As--

Column 3, line 2, after seen, insert --,--

Column 3, line 5, after process, delete "is"

Column 3, line 5, after used, insert --to--

Column 3, line 10, delete "FIG. 5 is"

Column 5, line 1, delete "worker", insert --workers--

Column 8, line 2, after assigned, delete "jobs"

Column 10, line 10, delete "tasked", insert --task--

Signed and Sealed this  
Twenty-sixth Day of February, 2013

Teresa Stanek Rea  
*Acting Director of the United States Patent and Trademark Office*